US011102231B2

(12) United States Patent
Kraning et al.

(10) Patent No.: US 11,102,231 B2
(45) Date of Patent: Aug. 24, 2021

(54) DISTRIBUTED SCANNING

(71) Applicant: Palo Alto Networks, Inc., Santa Clara, CA (US)

(72) Inventors: Matthew Kraning, San Francisco, CA (US); Matthew Anderson, San Francisco, CA (US); Peter Dickinson, Vallejo, CA (US); Corey Fredericks, Oakland, CA (US); John Holliman, San Francisco, CA (US); Andrew Seidel, San Francisco, CA (US)

(73) Assignee: Palo Alto Network, Inc., Santa Clara, CA (US)

( * ) Notice: Subject to any disclaimer, the term of this patent is extended or adjusted under 35 U.S.C. 154(b) by 382 days.

(21) Appl. No.: 15/466,735

(22) Filed: Mar. 22, 2017

(65) Prior Publication Data
US 2018/0278626 A1 Sep. 27, 2018

(51) Int. Cl.
*H04L 29/06* (2006.01)
*H04L 29/08* (2006.01)

(52) U.S. Cl.
CPC .......... *H04L 63/1433* (2013.01); *H04L 67/10* (2013.01); *H04L 67/32* (2013.01)

(58) Field of Classification Search
CPC ............. H04L 63/1433; H04L 41/0853; H04L 41/0866; H04L 41/12; H04L 67/10; H04L 67/03
See application file for complete search history.

(56) References Cited

U.S. PATENT DOCUMENTS

| 9,544,327 | B1 | 1/2017 | Sharma |
| 2003/0212779 | A1* | 11/2003 | Boyter ..................... H04L 41/22 709/223 |
| 2005/0229255 | A1 | 10/2005 | Gula et al. |
| 2007/0005738 | A1 | 1/2007 | Alexion-Tiernan |
| 2012/0192276 | A1 | 7/2012 | Andrews |
| 2014/0007241 | A1* | 1/2014 | Gula .................... H04L 63/1433 726/25 |
| 2014/0013434 | A1* | 1/2014 | Ranum ................. H04L 63/145 726/24 |
| 2014/0373161 | A1 | 12/2014 | Hudson |

(Continued)

FOREIGN PATENT DOCUMENTS

| CN | 106161450 A | 11/2016 |
| CN | 106161450 A | 11/2016 |

OTHER PUBLICATIONS

Bou-Harb, Elias, et al., "Cyber Scanning: A comprehensive Survey", IEEE Communications Surveys & Tutorials, vol. 16, No. 3, DOI: 10.1109/SURV.2013.102913.00020, pp. 1496-1519, 2014.

*Primary Examiner* — Minh Dinh
(74) *Attorney, Agent, or Firm* — Gilliam IP PLLC (57) ABSTRACT

A system for scanning a network includes an interface and a processor. The interface is configured to receive an indication to scan a set of network addresses. The processor is configured to determine a set of available scanning nodes and determine a job plan for scanning the set of network addresses using the set of available scanning nodes. The job plan includes one or more job portions. The processor is configured to, for a job portion of the one or more job portions, select a scanning node of the set of available scanning nodes and provide the job portion to the scanning node.

18 Claims, 9 Drawing Sheets

(56) References Cited

U.S. PATENT DOCUMENTS

| | | | |
|---|---|---|---|
| 2015/0150072 A1* | 5/2015 | Doctor | H04L 63/20 |
| | | | 726/1 |
| 2016/0314307 A1 | 10/2016 | Kacin | |
| 2016/0330245 A1* | 11/2016 | Bell | H04L 63/1433 |
| 2018/0270109 A1* | 9/2018 | Hollis | H04L 41/0803 |

* cited by examiner

DISTRIBUTED SCANNING

BACKGROUND OF THE INVENTION

Internet connected assets (e.g., computers, mobile devices, server systems, client systems, internet-of-things devices, etc.) comprise computing systems in communication with the Internet. Internet connected assets commonly include one or more publicly addressable communication ports, allowing any Internet connected device to query the asset. Some devices allow a range of connection types (e.g., HTTP connections HTTPS connections, FTP connections, FTPS connections, telnet connections, SSH connections, etc.) over the one or more publicly accessible ports. Internet connected assets can be a wide range of different types of hardware devices running a wide range of software including a wide range of configuration options, creating a myriad of possibilities for security vulnerabilities. A typical systems administrator may not be aware of every detail of every system under his or her watch, creating a problem where system vulnerabilities may go undetected and unfixed. Scanning a wide range of network addresses can provide understanding that is not available in any other way; however, it can require a large amount of computing power and communications bandwidth to perform the scan. A single computer may not be able to perform the scan adequately.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for scanning a network comprises an interface to receive an indication to scan a set of network addresses, and a processor to: determine a set of available scanning nodes, determine a job plan for scanning the set of network addresses using the set of scanning nodes, wherein the job plan comprises one or more job portions, and for each job portion of the one or more job portions: select a scanning node of the set of scanning nodes, provide the job portion to the scanning node, and receive a scanning result from the scanning node. In some embodiments, the system additionally comprises a memory coupled to the processor and configured to provide the processor with instructions.

In some embodiments, a system for network scanning comprises a system for determining information about a network by scanning some or all of the computers on it. In some embodiments, a system for network scanning comprises a system for improving network security by determining a complete outside view of the network. In various embodiments, a system for network scanning scans for devices associated with an organization, for open ports on a device, for services running on a device, for information indicating multiple devices are associated, for device configuration information, for device encryption information, for device network settings, or for any other appropriate information. In some embodiments, the system for network scanning scans a portion of the Internet. In some embodiments, the system for network scanning scans the entire Internet. In some embodiments, when a system for network scanning receives a request to scan a large network (e.g., the entire Internet), the scanning is performed using a distributed system. In some embodiments, the distributed system comprises a master system (e.g., a network scanning controller) and one or more slave systems (e.g., scanning nodes). In some embodiments, the master system determines a job plan based on a requested scan and a set of available scanning nodes, provides portions of the job plan to the available scanning nodes in order to accomplish the requested scan, and combines the results received from the scanning nodes to create the complete scan result.

Figure 1:
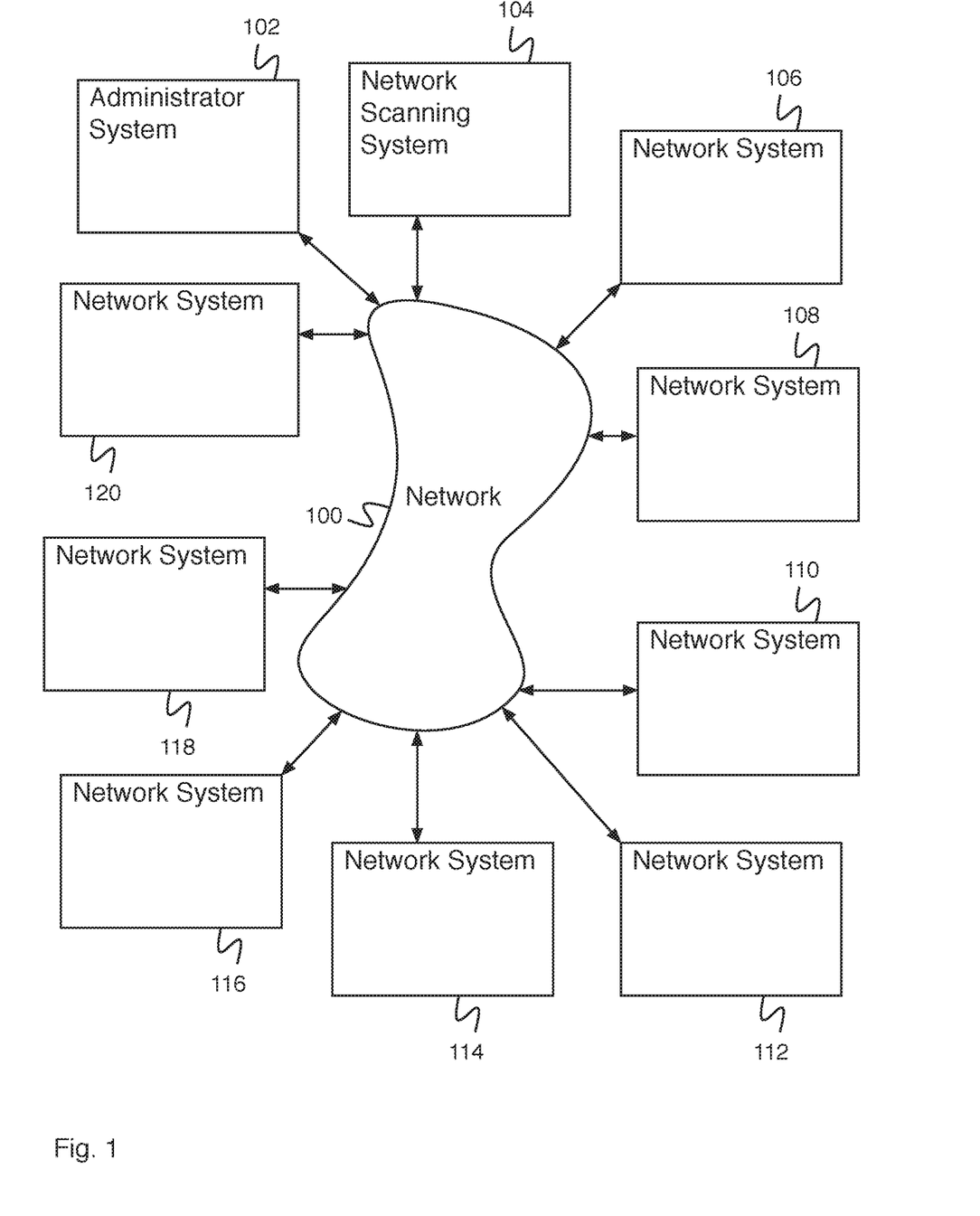
FIG. 1 is a block diagram illustrating an embodiment of a network system.

FIG. 1 is a block diagram illustrating an embodiment of a network system. In some embodiments, the network system of FIG. 1 comprises a system for network scanning. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102 and network scanning system 104 communicate via network 100. Administrator system 102 comprises a system for an administrator. In various embodiments, administrator system 102 comprises a system for an administrator to access applications on an application system, to access data on a database system, to indicate to network scanning system 104 to perform a network scanning process, to receive data from network scanning system 104, to configure a network system (e.g., network system 106), to receive data from a network system, or for any other appropriate purpose. In some embodiments, administrator system 102 comprises a processor and a memory. Network scanning system 104 comprises a system for scanning a network. In some embodiments, network scanning system 104 comprises a system for scanning data associated with network systems in response to a command from administrator system 102. In some embodiments, network scanning system 104 comprises a system for scanning data associated with a set of network systems (e.g. network system 106, network system 108, network system 110, network system 112, network system 114, network system 116, network system 118, and network system 120). In some embodiments, scanning data associated with a set of network systems comprises analyzing previously stored data associated with the set of network systems. In some embodiments, scanning data associated with a set of network systems comprises providing a payload to one or more network systems of the set of network systems and analyzing the received response, in the event a response is received. In some embodiments, network scanning system 104 comprises a processor and a memory. Each network system of FIG. 1 (e.g., network system 106) comprises an Internet connected system (e.g., a desktop computer, a laptop computer, a smartphone, a tablet computer, a server system, an internet-of-things device, etc.). In various embodiments, the system of FIG. 1 comprises 8, 13, 197, 2222, one million, one hundred million, or any other appropriate number of network systems. In some embodiments, each network system of FIG. 1 is associated with an Internet address. In some embodiments, an Internet address comprises an IP (e.g., Internet Protocol) address. In the example shown, network scanning system 104 comprises a centralized network scanning system (e.g., the elements of the network scan including determining addresses to scan, scanning, and analyzing the results of the scan are all performed by network scanning system 104).

Figure 2:
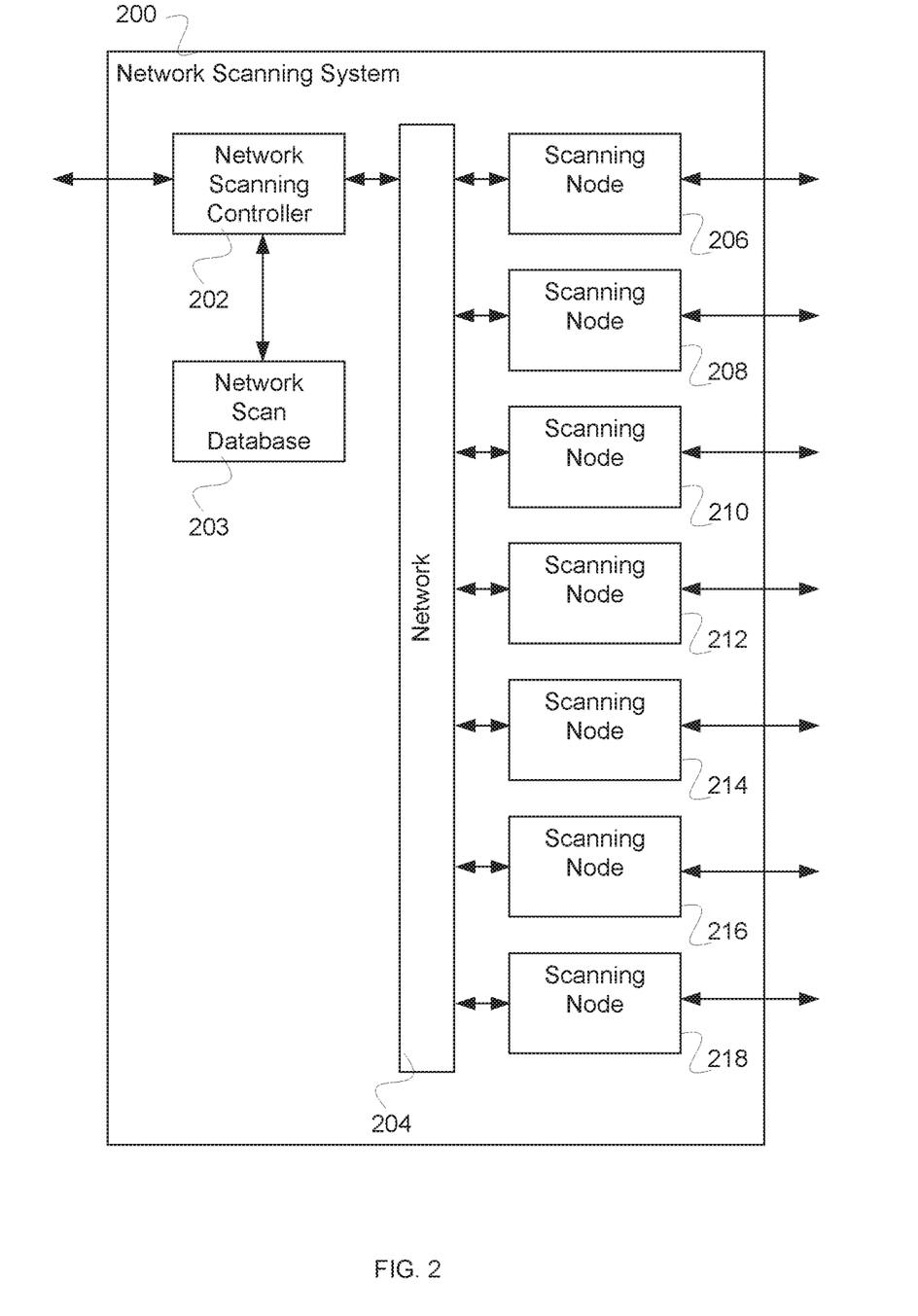
FIG. 2 is a block diagram illustrating an embodiment of a network scanning system.

FIG. 2 is a block diagram illustrating an embodiment of a network scanning system. In some embodiments, the network scanning system of FIG. 2 comprises a system for network scanning 104 of FIG. 1. In the example shown, network scanning system 200 comprises network scanning controller 202, network scan database 203, network 204, and a plurality of scanning nodes (e.g., scanning node 206, scanning node 208, scanning node 210, scanning node 212, scanning node 214, scanning node 216, and scanning node 218). Network scanning controller 202 comprises a system for receiving an indication to scan a set of network addresses (e.g., from a user or an administrator system). Network scanning controller 202 determines portions of the scan to be performed by a plurality of scanning nodes, directs scanning nodes to each perform a portion of the requested scan, receives back results from each of the scanning nodes, provides the results to a network scan database (e.g., network scan database 203), determines differences between current results and previous results (e.g., previous results also stored in network scan database 203), and providing the requestor an indication of results, results, or a summary of the results. In some embodiments, network scanning controller 202 comprises a system implemented using cloud computing hardware. In some embodiments, network scanning controller 202 comprises a system to receive an indication of a set of scanning nodes (e.g., scanning node 208 and scanning node 216). In some embodiments, scanning nodes comprise network systems for scanning. Network scanning controller 202 communicates with network scan database 203 for storing network scanning results. Network scanning controller 202 communicates with the plurality of scanning nodes using network 204. In various embodiments, network 204 comprises one or more of the following: a local area network, a wide area network, a wired network, a wireless network, the Internet, an intranet, a storage area network, or any other appropriate communication network. In various embodiments, there are 1, 2, 4, 7, 11, 25, 92, 297, 1001, or any other appropriate number of scanning nodes in communication with network scanning controller 202. In some embodiments, scanning nodes are located physically remotely from one another and from network scanning controller 202. In some embodiments, scanning nodes are implemented using cloud computing hardware. In some embodiments, scanning nodes are implemented using a different system than network scanning controller 202 (e.g., different cloud computing hardware). In some embodiments, scanning nodes do not comprise publicly visible information for identifying their association with network scanning controller 202.

Figure 3:
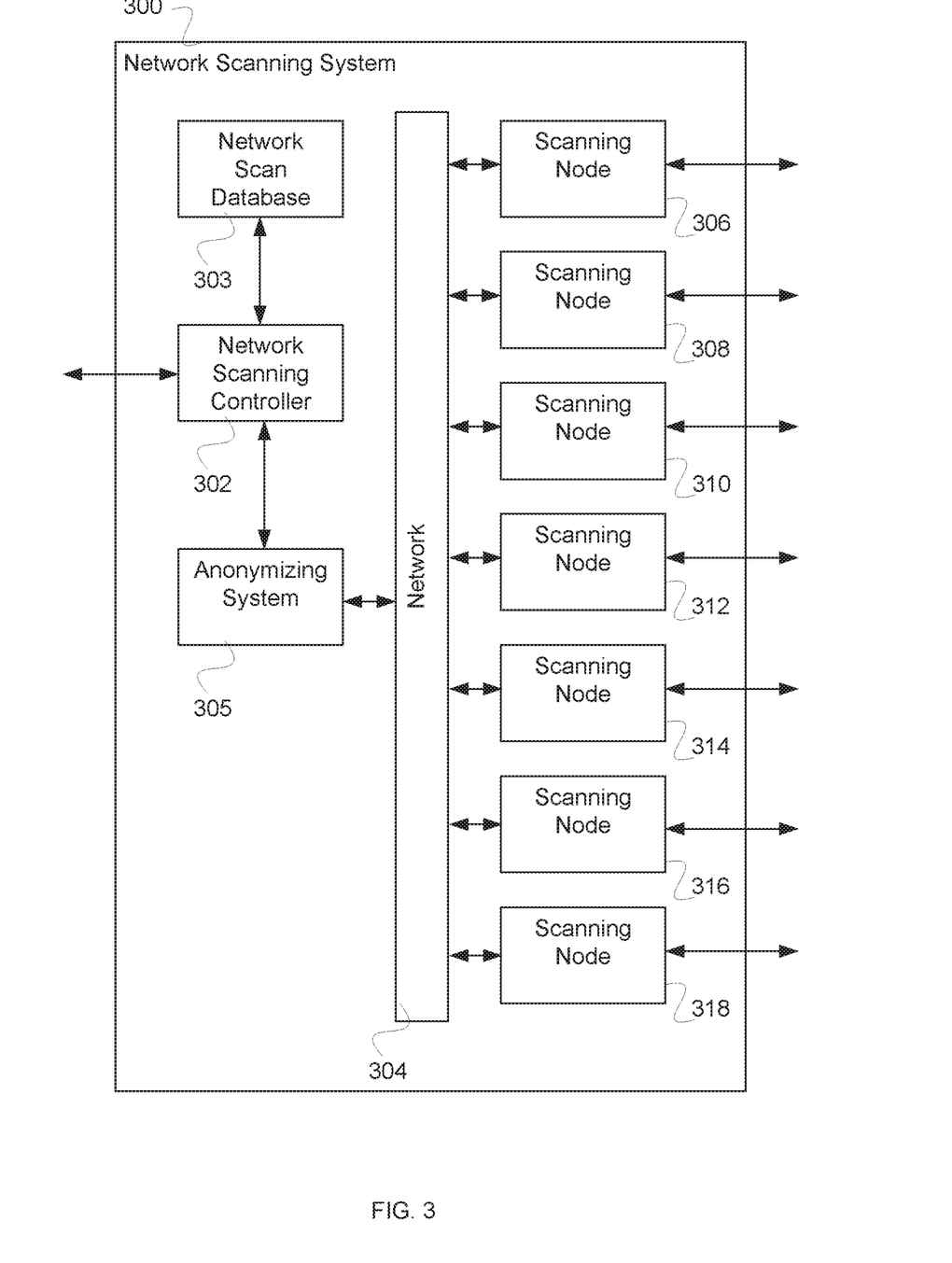
FIG. 3 is a block diagram illustrating an embodiment of a network scanning system.

FIG. 3 is a block diagram illustrating an embodiment of a network scanning system. In some embodiments, the network scanning system of FIG. 3 comprises a system for network scanning 104 of FIG. 1. In the example shown, network scanning system 300 comprises network scanning controller 302, network scan database 303, network 304, anonymizing system 305, and a plurality of scanning nodes (e.g., scanning node 306, scanning node 308, scanning node 310, scanning node 312, scanning node 314, scanning node 316, and scanning node 318). Network scanning controller 302 comprises a system for receiving an indication to scan a set of network addresses (e.g., from a user or an administrator system). Network scanning controller 302 determines portions of the scan to be performed by a plurality of scanning nodes, directs scanning nodes to each perform a portion of the requested scan, receives back results from each of the scanning nodes, provides the results to a network scan database (e.g., network scan database 303), determines differences between current results and previous results (e.g., previous results also stored in network scan database 303), and providing the requestor an indication of results, results, or a summary of the results. In some embodiments, network scanning controller 302 comprises a system implemented using cloud computing hardware. In some embodiments, network scanning controller 302 comprises a system to receive an indication of a set of scanning nodes (e.g., scanning node 308 and scanning node 316). In some embodiments, scanning nodes comprise network systems for scanning. Network scanning controller 302 communicates with network scan database 303 for storing network scanning results. Network scanning controller 302 communicates with the plurality of scanning nodes via anonymizing system 306. In various embodiments, anonymizing system 306 comprises an anonymizing virtual private network, a tunneling system, or any other appropriate anonymizing system. Anonymizing system 305 makes it difficult for scan target systems to identify the scanning controller behind the plurality of scanning systems. Anonymizing system 305 communicates with a plurality of scanning nodes using network 304. In various embodiments, network 304 comprises one or more of the following: a local area network, a wide area network, a wired network, a wireless network, the Internet, an intranet, a storage area network, or any other appropriate communication network. In various embodiments, there are 1, 2, 4, 7, 11, 25, 92, 297, 1001, or any other appropriate number of scanning nodes in communication with network scanning controller 302. In some embodiments, scanning nodes are located physically remotely from one another and from network scanning controller 302. In some embodiments, scanning nodes are implemented using cloud computing hardware. In some embodiments, scanning nodes are implemented using a different system than network scanning controller 302 (e.g., different cloud computing hardware). In some embodiments, scanning nodes do not comprise publicly visible information for identifying their association with network scanning controller 302.

Figure 4:
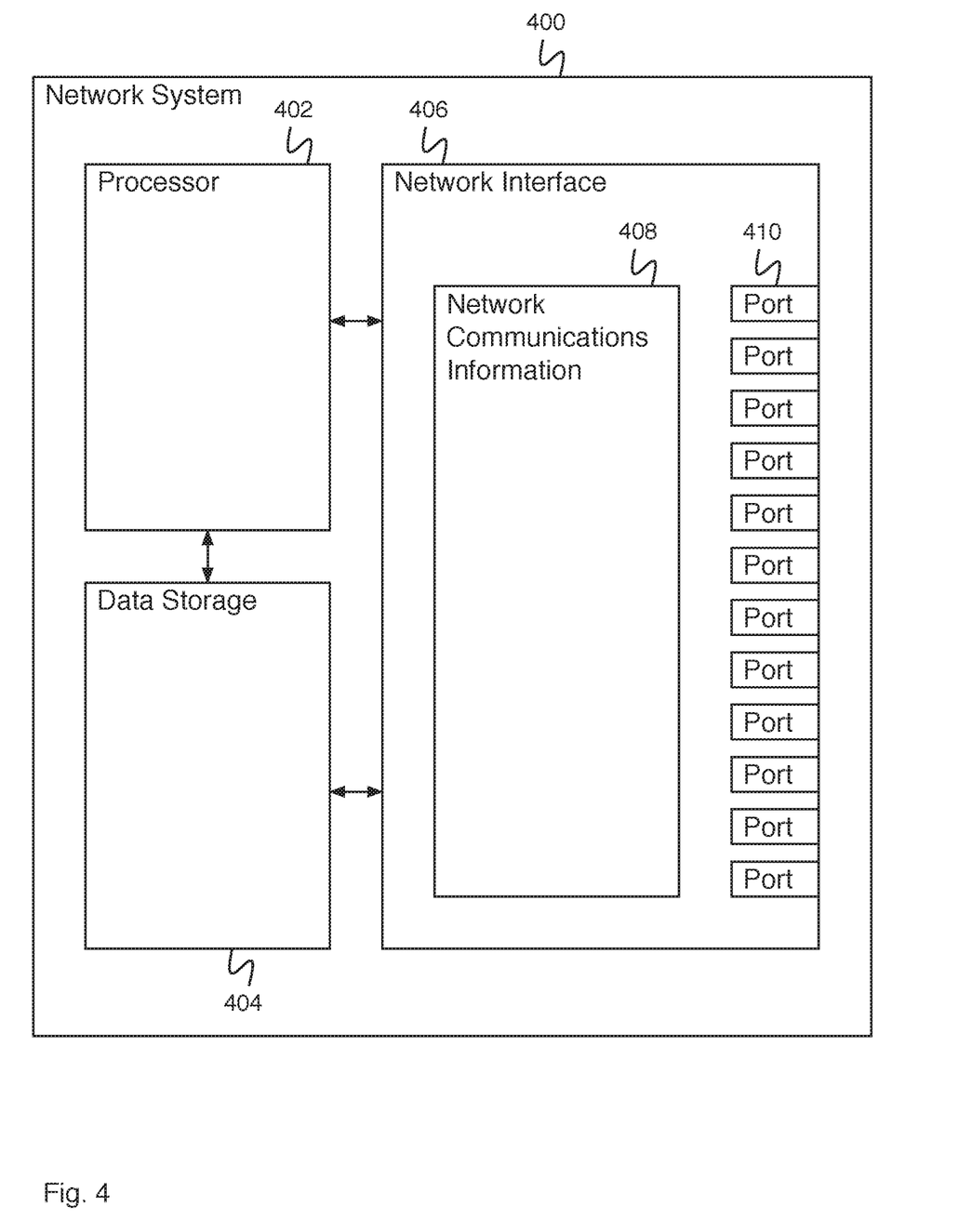
FIG. 4 is a block diagram illustrating an embodiment of a network system.

FIG. 4 is a block diagram illustrating an embodiment of a network system. In some embodiments, network system 400 comprises a network system of FIG. 1 (e.g., network system 106). In the example shown, network system 400 comprises processor 402, data storage 404, and network interface 406. In some embodiments, network system 400 comprises an Internet connected asset (e.g., a desktop computer, a laptop computer, a smartphone, a tablet computer, a server system, an Internet-of-things device, or any other appropriate Internet connected asset). In various embodiments, processor 402 comprises a processor for executing instructions, processing data, responding to commands, etc. In various embodiments, processor 402 comprises a general-purpose processor, a microcontroller, a parallel processing system, a cluster of processors, or any other appropriate processor. In various embodiments, data storage 404 comprises a data storage for storing data, for storing instructions for processor 402, for storing configuration information, or for storing any other appropriate information. In various embodiments, data storage 404 comprises one or more of a volatile memory, a non-volatile memory, a magnetic memory, an optical memory, a phase-change memory, a semiconductor memory, a disc memory, a tape memory, or any other appropriate memory. Network interface 406 comprises a network interface for communicating with a network. In the example shown, network interface 406 comprises network communications information 408 and a plurality of ports (e.g., port 410). In various embodiments, network communications information comprises network communications software, network communications settings, network communications data, or any other appropriate network communications information. The plurality of ports comprises physical ports (e.g., plugs for connecting cables to network system 400) or virtual ports (e.g., virtual communications channels identified by a virtual port number). In some embodiments, network interface 406 comprises a network address (e.g., a network address assigned by an external network addressing authority). In some embodiments, communication with network system 400 is specified by indicating the network address of network 400 along with a port number. In some embodiments, some ports of network interface 406 are configured for communication (e.g., comprising open ports) and some are configured to not respond to communication. In some embodiments, open port configuration information is stored in network communications information 408. In some embodiments, some ports are associated with one or more specific communications services (e.g., hypertext transmission protocol (HTTP), file transfer protocol (FTP), secure shell (SSH), etc.). In some embodiments, configuration information associating services with ports is stored in network communications information 408. In some embodiments, network communications information 408 comprises encryption information (e.g., a public SSH key, a certificate, etc.). In some embodiments, network communications information 408 comprises a network system name or names (e.g., a hostname, a domain name, a set of hostnames, a hostname pattern, etc.). In some embodiments, network communications information comprises text information associated with a service or a set of services (e.g., a welcome text, a connection refused text, a service not supported text, a file not found text, or any other appropriate text information). In some embodiments, network interface 406 comprises a set of network hardware (e.g., a modem) running a set of communications software that has been configured according to a set of communications specifications.

Figure 5:
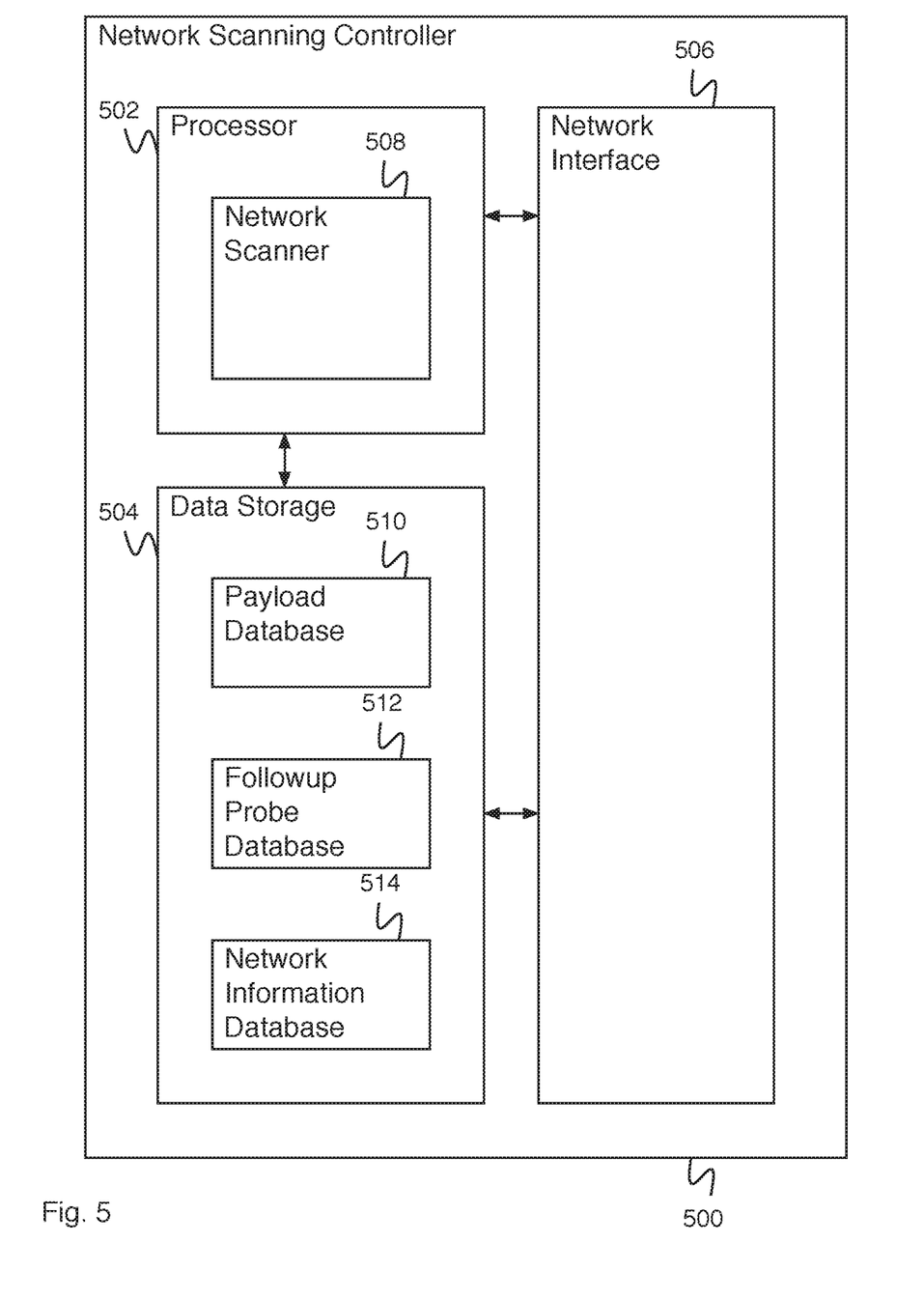
FIG. 5 is a block diagram illustrating an embodiment of a network scanning controller.

FIG. 5 is a block diagram illustrating an embodiment of a network scanning controller. In some embodiments, network scanning controller 500 comprises network scanning controller 202 of FIG. 2. In some embodiments, network scanning controller 500 comprises a server system. In the example shown, network scanning controller 500 comprises processor 502, data storage 504, and network interface 506. In various embodiments, processor 502 comprises a processor for executing instructions, processing data, responding to commands, etc. In various embodiments, processor 502 comprises a general-purpose processor, a microcontroller, a parallel processing system, a cluster of processors, or any other appropriate processor. In some embodiments, processor 502 comprises network scanner 508. In various embodiments, network scanner 508 comprises software and/or hardware implementing hierarchical scanning system functionality. In some embodiments, network scanner 508 comprises a network scanner for determining a job plan. In some embodiments, a job plan comprises a set of scanning instructions. In some embodiments, a job plan comprises a job plan for scanning a set of network addresses using a set of available scanning nodes. In some embodiments, a job plan comprises a set of network addresses and ports to scan. In some embodiments, a job plan comprises one or more payloads and follow-up probes for interacting with a network device. In some embodiments, a job plan comprises one or more job portions. In some embodiments, job portions comprise divisible and independently executable job portions (e.g., job portions that can be run in parallel and do not depend on one another). In various embodiments, data storage 504 comprises a data storage for storing data, for storing instructions for processor 502, for storing configuration information, or for storing any other appropriate information. In various embodiments, data storage 504 comprises one or more of a volatile memory, a non-volatile memory, a magnetic memory, an optical memory, a phase-change memory, a semiconductor memory, a disc memory, a tape memory, or any other appropriate memory. In the example shown, data storage 504 comprises payload database 510 for storing payloads for providing to network devices. In some embodiments, a payload comprises a small data packet for probing a network device in order to elicit a response. Data storage 504 additionally comprises follow-up probe database 512 for storing follow-up probes for interacting with network devices. In some embodiments, a follow-up probe comprises software for interacting with a network device in order to determine information about the network device. In some embodiments, follow-up probe database 512 comprises a set of follow-up probes, each designed to interact with a network device in a specific way to retrieve data about the network device (e.g., establish a secure HTTP (HTTPS) connection and download an encrypted web page). In some embodiments, a follow-up probe is used to interact with a network device once it is determined that the follow-up probe is likely to succeed in receiving data from the network device. Data storage 504 additionally comprises network information database 514 for storing network information received as a result of interacting with network devices (e.g., using a payload or a follow-up probe). In some embodiments, network information is stored remotely (e.g., on a storage server, on a different hierarchical scanning system, on cloud storage, etc.). In the example shown, network interface 506 comprises a network interface for interacting with remote systems via a network. In various embodiments, network interface 506 comprises a network interface for providing a payload, for executing communications for a follow-up probe, for receiving network information, or for any other appropriate purpose. In some embodiments, network interface 506 comprises a network interface configured for high bandwidth communication. In some embodiments, network interface 506 comprises a network interface for providing a job portion of a job plan to a scanning node. In some embodiments, network interface 506 comprises a network interface for receiving a job portion result from a scanning node.

Figure 6:
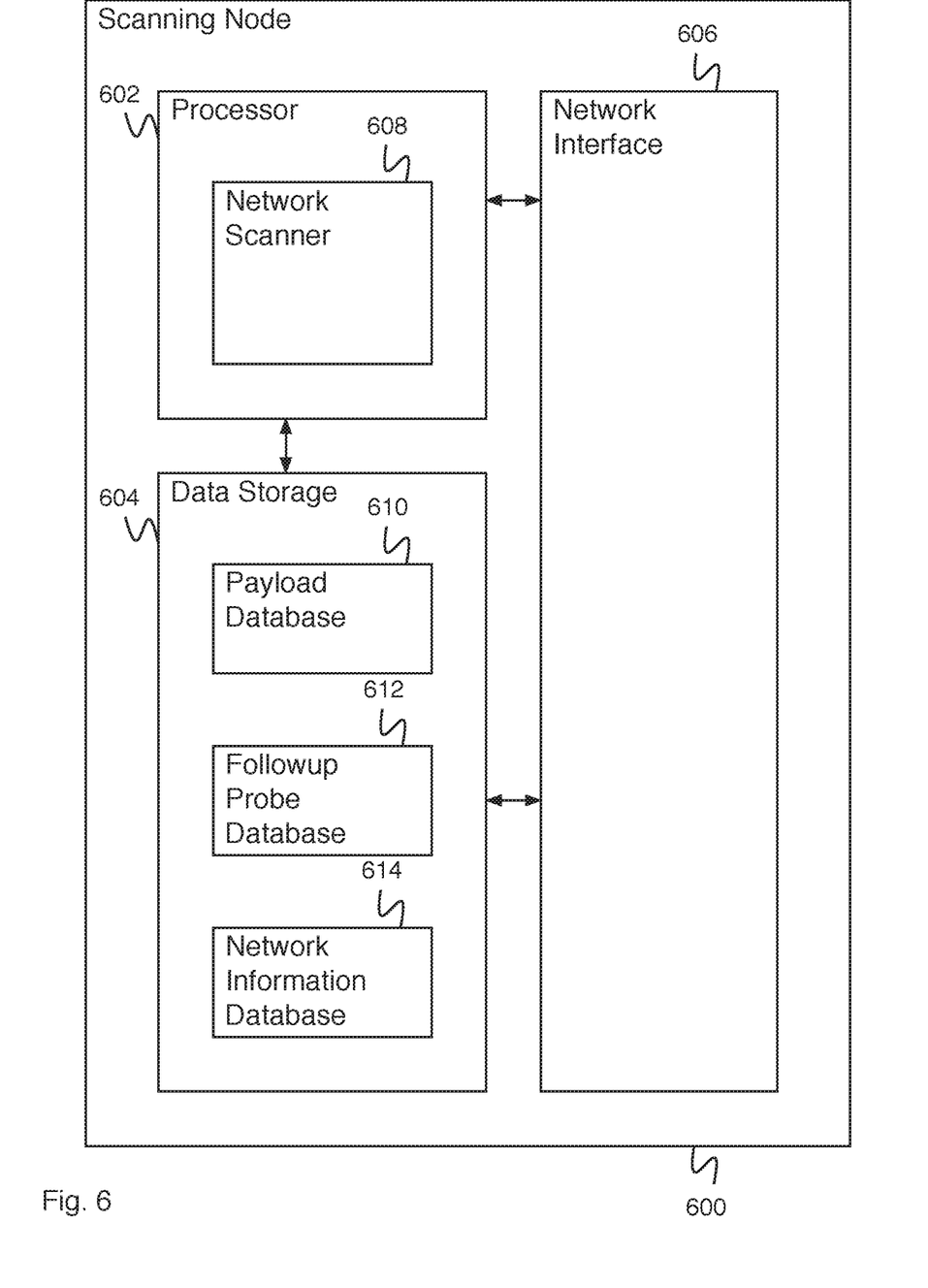
FIG. 6 is a block diagram illustrating an embodiment of a scanning node.

FIG. 6 is a block diagram illustrating an embodiment of a scanning node. In some embodiments, scanning node 600 comprises a scanning node of FIG. 2 (e.g., scanning node 208). In some embodiments, scanning node 600 comprises a client system. In the example shown, scanning node 600 comprises processor 602, data storage 604, and network interface 606. In various embodiments, processor 602 comprises a processor for executing instructions, processing data, responding to commands, etc. In various embodiments, processor 602 comprises a general-purpose processor, a microcontroller, a parallel processing system, a cluster of processors, or any other appropriate processor. In some embodiments, processor 602 comprises network scanner 608. In various embodiments, network scanner 608 comprises software and/or hardware implementing hierarchical scanning system functionality. In various embodiments, data storage 604 comprises a data storage for storing data, for storing instructions for processor 602, for storing configuration information, or for storing any other appropriate information. In various embodiments, data storage 604 comprises one or more of a volatile memory, a non-volatile memory, a magnetic memory, an optical memory, a phase-change memory, a semiconductor memory, a disc memory, a tape memory, or any other appropriate memory. In the example shown, data storage 604 comprises payload database 610 for storing payloads for providing to network devices. In some embodiments, a payload comprises a small data packet for probing a network device in order to elicit a response. Data storage 604 additionally comprises follow-up probe database 612 for storing follow-up probes for interacting with network devices. In some embodiments, a follow-up probe comprises software for interacting with a network device in order to determine information about the network device. In some embodiments, follow-up probe database 612 comprises a set of follow-up probes, each designed to interact with a network device in a specific way to retrieve data about the network device (e.g., establish a secure HTTP (HTTPS) connection and download an encrypted web page). In some embodiments, a follow-up probe is used to interact with a network device once it is determined that the follow-up probe is likely to succeed in receiving data from the network device. Data storage 604 additionally comprises network information database 614 for storing network information received as a result of interacting with network devices (e.g., using a payload or a follow-up probe). In some embodiments, network information is stored remotely (e.g., on a storage server, on a different hierarchical scanning system, on cloud storage, etc.). In the example shown, network interface 606 comprises a network interface for interacting with remote systems via a network. In various embodiments, network interface 606 comprises a network interface for providing a payload, for executing communications for a follow-up probe, for receiving network information, or for any other appropriate purpose. In some embodiments, network interface 606 comprises a network interface configured for high bandwidth communication.

In some embodiments, network scanner 608 executes a network scan according to instructions provided to it by a network scanning controller (e.g., network scanning controller 204 of FIG. 2 or network scanning controller 302 of FIG. 3). In some embodiments, instructions comprise a job portion (e.g., a job portion of a scanning job). In various embodiments, instructions comprise one or more Internet addresses, one or more ports, one or more payloads, one or more follow-up probes, or any other appropriate scan instructions.

Figure 7:
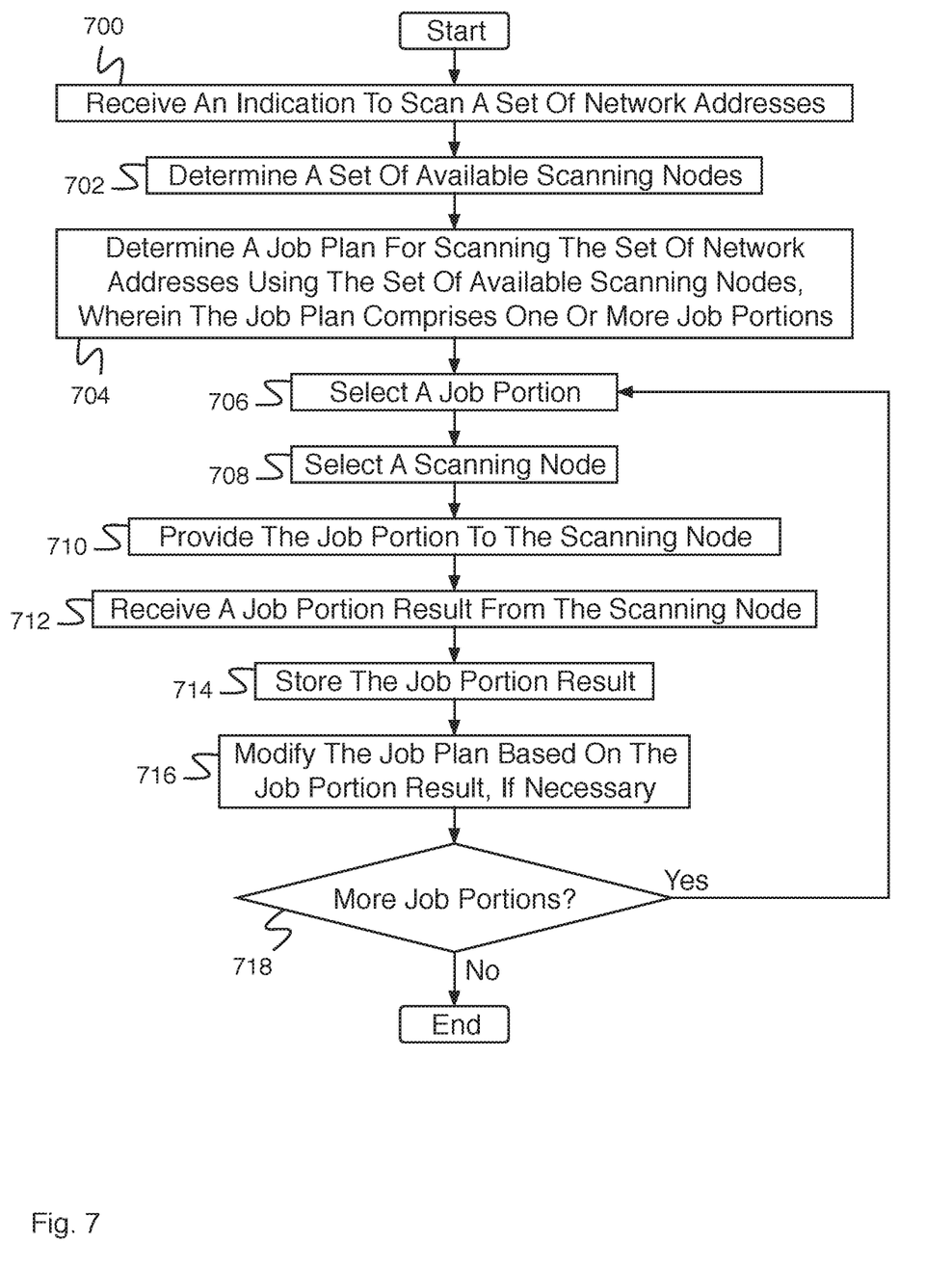
FIG. 7 is a flow diagram illustrating an embodiment of a process for scanning a network.

FIG. 7 is a flow diagram illustrating an embodiment of a process for scanning a network. In some embodiments, the process of FIG. 7 is executed by network scanning controller 204 of FIG. 2. In the example shown, in 700, an indication is received to scan a set of network addresses. In 702, a set of available scanning nodes is determined. In 704, a job plan is determined for scanning the set of network addresses using the set of available scanning nodes, wherein the job plan comprises one or more job portions. In 706, a job portion is selected. In 708, a scanning node is selected. In some embodiments, the scanning node is selected based at least in part on the job portion. In various embodiments, the scanning node comprises a randomly chosen scanning node, a pseudorandomly chosen scanning node, the next scanning node in a list of scanning nodes, the scanning node with the least processor load, the scanning node has not been recently selected, the scanning node that has least recently scanned addresses of the job portion, the next scanning node to scan the addresses of the job portion according to a predetermined list, a scanning node chosen based at least in part on its physical location, or a scanning node chosen in any other appropriate way. In 710, the job portion is provided to the scanning node. In 712, a job portion result is received from the scanning node. In 714, the job portion result is scanned. In some embodiments, the job portion result is stored by the network scanning controller. In some embodiments, the job portion result is provided to a network scan database for storage. In 716, the job plan is modified based on the job portion result, if necessary. In various embodiments, the job plan is modified to scan additional address, to scan additional ports, to execute additional scan types, to execute additional follow-up probes, or in any other appropriate way. In 718, it is determined whether there are more job portions (e.g., of the job plan). In the event it is determined that there are more job portions, control passes to 706. In the event it is determined that there are not more job portions, the process ends.

Figure 8:
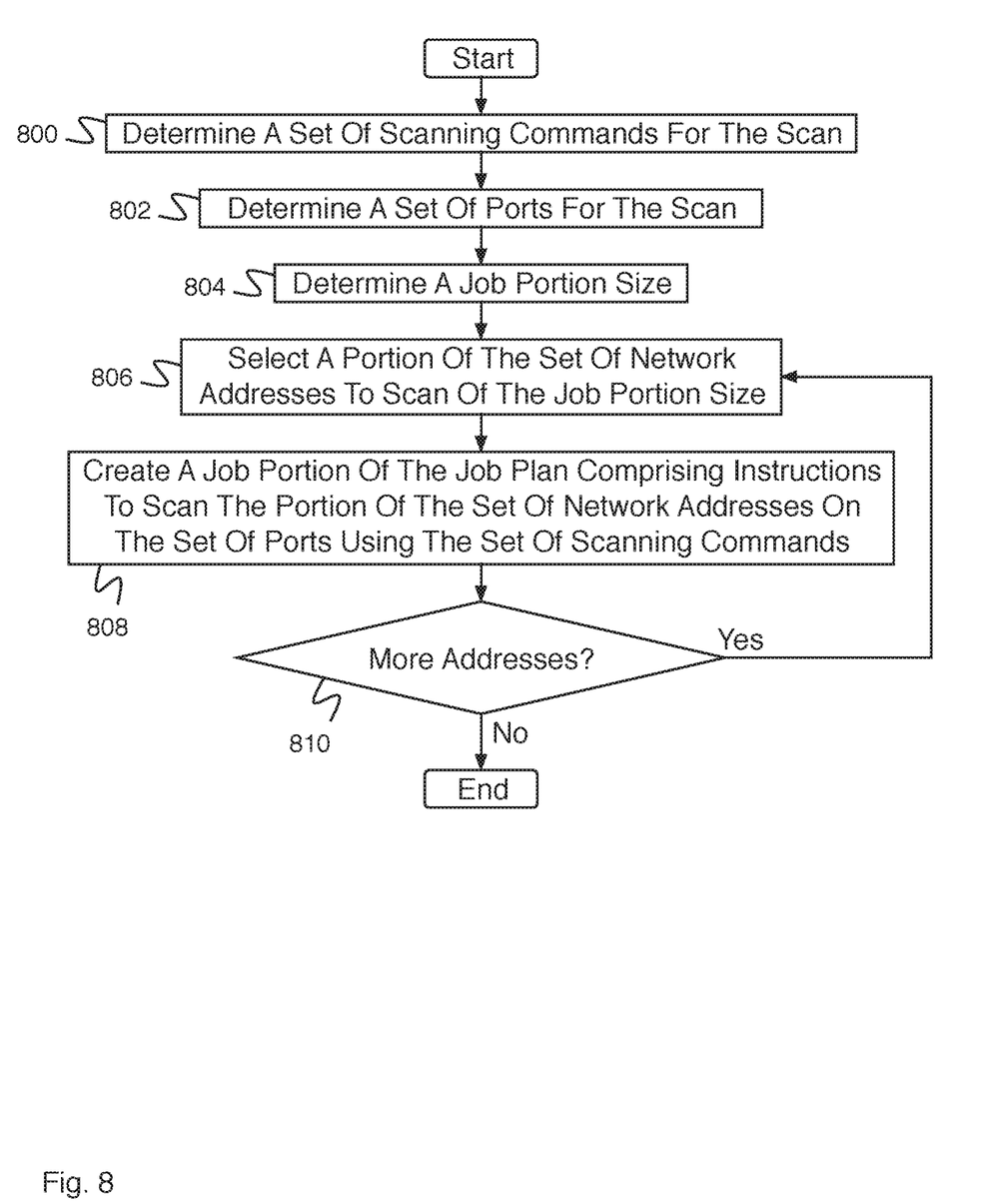
FIG. 8 is a flow diagram illustrating an embodiment of a process for determining a job plan.

FIG. 8 is a flow diagram illustrating an embodiment of a process for determining a job plan. In some embodiments, the process of FIG. 8 implements 704 of FIG. 7. In the example shown, in 800, a set of scanning commands for the scan is determined. In various embodiments, scanning commands comprise shell commands, payloads, follow-up probes, or any other appropriate scanning commands. In some embodiments, scanning commands comprise part of a received indication to scan (e.g., the indication to scan indicates scanning commands for the scan). In some embodiments, scanning commands are determined based at least in part on indicated commands to scan (e.g., additional scanning commands are determined beyond indicated commands to scan, commands to scan are modified, etc.). In 802, a set of ports for the scan is determined. In some embodiments, ports to scan comprise part of a received indication to scan (e.g., the indication to scan indicates ports for the scan). In some embodiments, ports are determined based at least in part on indicated commands to scan (e.g., additional ports are determined beyond indicated commands to scan, port are modified, etc.). In 804, a job portion size is determined. In various embodiments, a job portion size is determined based at least in part on one or more of: a predetermined job portion size, a number of available scanning nodes, a number of addresses to scan, a distribution of addresses to scan, physical locations associated with addresses to scan, historical scanning data, current and historical organizational network footprints, or any other appropriate factor. In 806, a portion of the set of network addresses to scan of the job portion size is selected. In various embodiments, a contiguous set of network addresses is selected, a discontiguous set of network addresses is selected, a random set of network addresses is selected, a pseudorandom set of network addresses is selected, a set of network addresses with common organizational ownership or common network management is selected, a set of network addresses with multiple distinct gateway devices and/or traffic concentrators is selected, or a set of network addresses is selected in any other appropriate way. In 808, a job portion of the job plan is created comprising instructions to scan the portion of the set of ports using the set of network commands. In 810, it is determined whether there are more addresses (e.g., more addresses of the set of network addresses to scan that have not been allocated to a job portion). In the event it is determined that there are more addresses, control passes to 806. In the event it is determined that there are not more addresses, the process ends.

Figure 9:
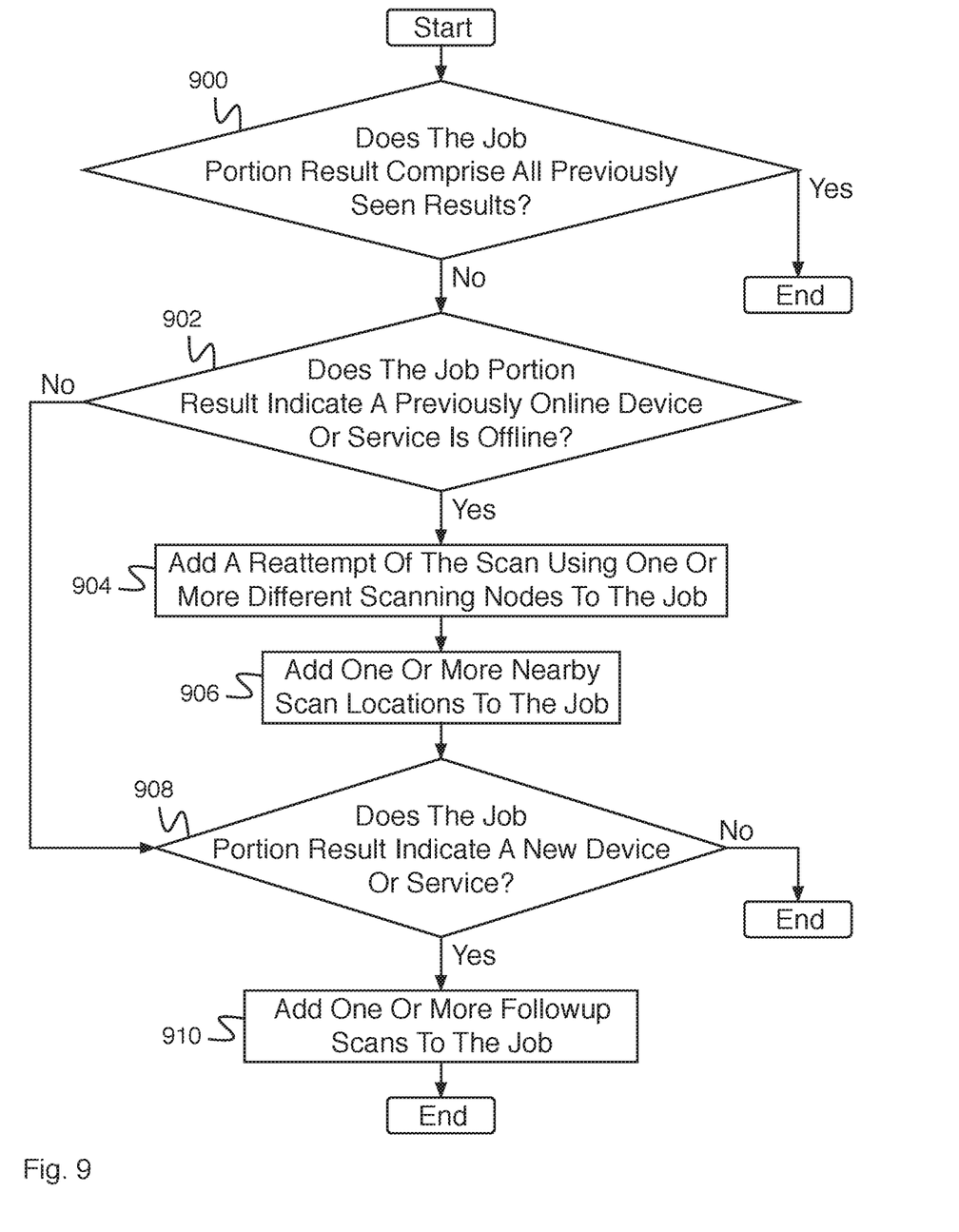
FIG. 9 is a flow diagram illustrating an embodiment of a process for modifying a job plan based on a job portion result, if necessary.

FIG. 9 is a flow diagram illustrating an embodiment of a process for modifying a job plan based on a job portion result, if necessary. In some embodiments, the process of FIG. 9 implements 716 of FIG. 7. In the example shown, in 900, it is determined whether the job portion comprises all previously seen results. In some embodiments, previously seen results comprise previously seen devices or services, or previously seen addresses or ports that produce no response. In the event it is determined that the job portion result comprises all previously seen results, the process ends (e.g., no modification of the job plan is made). In the event it is determined that the job portion result does not comprise all previously seen results, control passes to 902. In 902, it is determined whether the job portion result indicates a previously online device or service is offline. In the event it is determined that no previously online device or service is offline, control passes to 908. In the event it is determined that a previously seen device or service is offline, control passes to 904. In 904, a reattempt of the scan using one or more different scanning nodes is added to the job. For example, a scan is added to a different job portion that is assigned to a different selected scanning node than the scan had been previously assigned to so that the resulting scan does not appear to originate from the same source. In various embodiments, the reattempt is conducted using a randomly chosen scanning node, a scanning node that has scanned the previously online device or service least recently, a reserve scanning node only used in the case of determining whether a previously online device has gone offline, or any other appropriate scanning node. In 906, one or more nearby scan locations are added to the job. In some embodiments, scanning one or more nearby scan locations can find a device or service that has been moved. In some embodiments, nearby scan locations comprise nearby addresses. In some embodiments, nearby scan locations comprise nearby ports. In 908, it is determined whether the job portion result indicates a new device or service. In the event it is determined that the job portion result does not indicate a new device or service, the process ends. In the event it is determined that the job portion result indicates a new device or service, control passes to 910. In 910, one or more follow-up scans are added to the job. In some embodiments, follow-up scans comprise scans to collect further information about a newly discovered device or service. In some embodiments, follow-up scans comprise follow-up probes.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for scanning a network for devices associated with an organization, comprising:
   determining a complete outside view of the network by:
      receiving a request to scan the Internet with a network scanning controller for a set of network addresses for devices associated with the organization, where said devices have common organizational ownership or common network management, wherein said request to scan is for open ports on a device, services running on a device, device configuration information, device encryption information, and device network settings, the scan performed via the Internet from outside of the network via publicly accessible ports; and
      said network scanning controller scanning the Internet by determining a set of available scanning nodes;
      based on the requested scan and the set of available scanning nodes, said network scanning controller determining a job plan for scanning the set of network addresses by using the set of available scanning nodes to perform the scan, wherein the job plan comprises one or more job portions; and
      for a job portion of the one or more job portions:
         said network scanning controller selecting a scanning node of the set of available scanning nodes; and
         said network scanning controller providing the job portion to the scanning node;
      with each said scanning node, said network scanning controller performing a scan corresponding to said node's job portion; and
      said network scanning controller creating a complete scan result for said network by combining results received from the scanning nodes for the scan corresponding to each said node's respective job portion.

2. The method of claim 1, wherein the network scanning controller communicates with the scanning node via an anonymizing system.

3. The method of claim 1, wherein a job portion of the one or more job portions comprises instructions to scan a portion of the set of network addresses.

4. The method of claim 1, wherein a job portion of the one or more job portions comprises a set of ports.

5. The method of claim 1, wherein a job portion of the one or more job portions comprises a set of scanning commands.

6. The method of claim 1, wherein the scanning node is selected based at least in part on a job portion of the one or more job portions.

7. The method of claim 1, wherein the scanning node is selected based at least in part on a physical location of the scanning node.

8. The method of claim 1, wherein the scanning node is selected based at least in part on the scanning node having not been recently selected.

9. The method of claim 1, wherein the scanning node is selected randomly or pseudorandomly.

10. The method of claim 1, wherein the network scanning controller provides the job plan result to a database for storage.

11. The method of claim 1, wherein the network scanning controller receives a scanning result from the scanning node.

12. The method of claim 11, wherein the network scanning controller modifies the job plan based at least in part on a scanning result.

13. The method of claim 12, wherein modifying the job plan comprises adding a reattempt of a scan of a job portion of the one or more job portions using one or more different scanning nodes.

14. The method of claim 12, wherein modifying the job plan comprises adding one or more nearby scan locations to the job portion.

15. The method of claim 12, wherein modifying the job plan comprises adding one or more follow-up scans to the job portion.

16. The method of claim 1, wherein the set of available scanning nodes are implemented using cloud computing hardware.

17. The method of claim 1, wherein the set of available scanning nodes are implemented using a different system than the system for scanning the network.

18. The method of claim 1, wherein the set of available scanning nodes do not comprise publicly visible information for identifying their association with the system for scanning the network.

* * * * *